March 12, 1929. W. A. PETERS 1,705,027
CAMERA
Original Filed May 12, 1922 4 Sheets-Sheet 1

Witnesses:
W. F. Kilroy
Harry R. L. White

Inventor:
William A. Peters
Murray Lotz & Wilson

March 12, 1929. W. A. PETERS 1,705,027
CAMERA
Original Filed May 12, 1922 4 Sheets-Sheet 2

Witnesses:
W. F. Kilroy
Harry R. L. White Inventor:
William A. Peters
By Murray Ritz & Wilson
Attys March 12, 1929.  W. A. PETERS  1,705,027
CAMERA
Original Filed May 12, 1922  4 Sheets-Sheet 3

March 12, 1929.  W. A. PETERS  1,705,027
CAMERA
Original Filed May 12, 1922  4 Sheets-Sheet 4

Patented Mar. 12, 1929.

1,705,027

UNITED STATES PATENT OFFICE.

WILLIAM A. PETERS, OF CHICAGO, ILLINOIS, ASSIGNOR TO INTERNATIONAL PATENT LICENSING CORPORATION, OF CHICAGO, ILLINOIS, A CORPORATION OF ILLINOIS.

CAMERA.

Application filed May 12, 1922, Serial No. 560,406. Renewed November 11, 1927.

My invention relates to improvements in cameras, and has special reference to improvements in cameras of the roll film type, particularly as shown in Letters Patent of the United States, No. 1,395,295, issued to me November 1, 1921.

The object of my present invention is to provide simple interlocking and cooperating parts and mechanisms which will greatly simplify the manipulation of the camera and will positively prevent the premature or inadvertent operation of certain parts of the camera in advance of the proper arrangement or setting of certain cooperating and associated parts and mechanisms.

In my aforesaid patent, I describe and claim improvements relating to the positioning of two film rolls in relation to the focal plane of the camera for exposing different areas of the film, also means for positioning a ground glass frame in the focal plane for observation of the image when a rear camera door is opened and out of the focal plane when the rear camera door is closed.

In my present invention I provide interrelated mechanisms which cooperate to produce the following results. First to prevent the opening of the rear or ground glass door to expose the ground glass when the camera bellows support is within the camera or in other words in closed position. This is for preventing the straining of the parts, for when the bellows frame is in closed or retracted position there is not sufficient room within the camera to permit the forward positioning of the ground glass which is accomplished automatically upon the opening of the ground glass door. Second, to positively prevent the opening of the ground glass door to expose the film when the camera is open for use and the film is extended to any extent at all. Third, to prevent the extension of the film to any amount when the ground glass door, or in other words, the rear door of the camera case, is open.

A further feature of importance is to provide rigid supports for the ground glass frame to prevent the distortion of the frame and possible breaking of the ground glass should the bellows support be inadvertently pushed back into the camera case when the rear or ground glass door is open and the ground glass is positioned forwardly in the case for observation purposes.

My invention will be more readily understood by reference to the accompanying drawings forming part of this specification, and in which:—

As illustrated in the drawings the camera 1 which I have chosen in which to present an embodiment of my invention is of the pocket type. It has a sheet metal case 2 which is adapted to be closed into a flat elongated condition of a suitable size to be received in a large pocket or to be carried by hand. The case 2 comprises a front wall 3, a rear wall 4, half circular ends 5 and 6 and flat side walls 7 and 8. The front wall is provided with a door 9 adapted to close a rectangular opening 10, the door being hinged at its bottom edge 11 and adapted to open downwardly to the position shown in dotted lines in Figure 1 to provide a horizontal support upon which the lens board and mechanism 12 is supported when the bellows 13 is extended. The rear end of the bellows is secured to a rectangular frame 14 which is adapted to be maintained parallel to the front and back of the case and to be moved from a position adjacent to the rear wall of the case when the camera is closed to a position adjacent to the front wall of the case when the camera is open by means of guides and mechanism which it is not thought necessary to illustrate or describe as these do not comprise part of the present invention except in so far as said mechanisms enter into combination with other mechanisms hereinafter fully described.

The rear wall 4 has a rectangular opening 15 which receives a frame 16. This frame is provided with a rectangular opening 17 which is adapted to be closed by a hinged cover 18. This hinged cover 18 is what is known as the ground glass cover or rear door and adjacent to the frame 16 within the case there is arranged a plate of ground glass 19, the forward face 20 of which is smooth and the rear face 21 of which is ground. The peculiar mounting of the ground glass plate in connection with the ground glass cover 18 will be described more fully hereinafter. The frame 16 is secured to the casing by suitable screws 22.

Below the hinge 11 of the front door 9 the case is provided with a pocket 23 for containing two film roll frames 24 and 25. These frames are adapted to carry a film 26 wound on central shafts 27 in the casings 25 and 28 in the casing 24. These casings are movable bodily from the pocket 23 up into the casing of the camera and are adapted to be positioned with the film stretched between them centrally in relation to the lens mounted on the lens mechanism 12. As described in my said Patent No. 1,395,295, mechanism is provided for unreeling and reeling up the film for exposing portions having different lengths according to the size of picture desired, it being thought unnecessary to fully describe such mechanism in this application.

Figure 1:
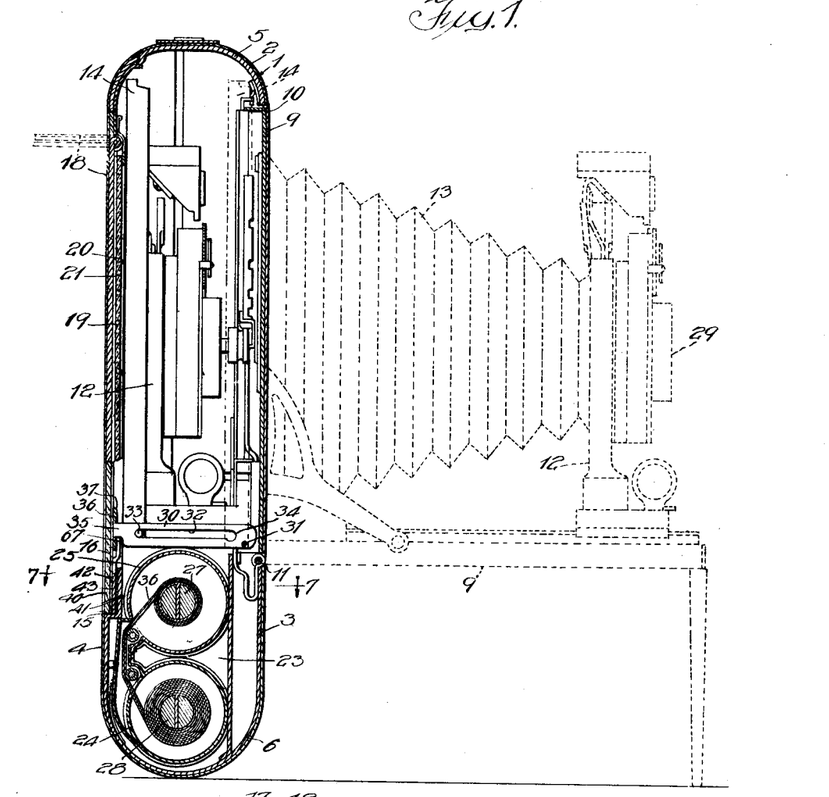
Figure 1 is a longitudinal sectional view of a camera just within one side edge thereof and substantially on the line 1—1 of Figure 2, the bellows, bellows support, and lens board and mechanism being shown in extended position in dotted lines.

As best shown in Figure 1, the frame 14 to which the bellows 13 is attached is situated close to the rear wall of the camera case when in its closed or retracted position leaving only sufficient room between the frame and the back of the case for the ground glass plate 19 and its frame. As explained heretofore the forward face 20 of the ground glass plate is smooth so that when the film is moved in relation thereto, the friction will be minimized and the rear face 21 is ground for the purpose of causing the image to appear. As the film when exposed lies against the forward face of the glass it is necessary in order to produce a sharply defined image on the ground or rear face of the glass to project the glass plate bodily forward into a position where its rear face lies in the focal plane. In Letters Patent of the United States, No. 1,374,678, issued to me April 12, 1921, I describe and claim means for thus projecting the ground glass plate forwardly when the rear or ground glass door is opened and it will now be understood that in order to prevent straining of any of the parts it is desirable to prevent the opening of the door 18 when the frame 14 is in its rear or closed position as shown in full lines in Figure 1. For this purpose, I make use of a swinging guide rail 30, see Figure 1, pivoted at 31 to a rigid part of the casing at one side adjacent to the forward door 9 and provided with a longitudinal slot 32 for receiving a guide pin 33 mounted rigidly on said frame 14 and projecting laterally therefrom. This swinging guide rail 30 is adapted to be swung to a horizontally rearwardly projecting position as shown in Figure 1 spanning the case from front to rear when the frame 14 is pushed back in the case. This guide rail and its several functions and operations is fully described and claimed in Letters Patent of the United States No. 1,292,036 issued to me Jan. 21, 1919. The forward end 34 of the slot 32 is provided with an offset notch which ends to the rear of the pivot 31 and whereby the guide rail is adapted to be swung to vertical position when the frame 14 reaches its forward position adjacent to the front wall of the casing as the lens board is drawn out. The rear end 35 of the guide rail 30 is adapted to enter a lateral notch 36 in a bracket 37 fixed to the rear wall of the casing adjacent to the frame 16.

Figure 16:
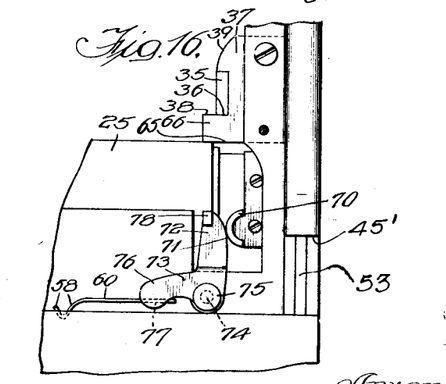
Figure 16 is a fragmentary rear elevation of the mechanism for locking the ground glass door closed when the film is extended.

As the frame 14 is moved rearwardly in the casing and swings the guide rail downwardly, the rear end contacts with a shoulder 38 constituting the lower wall of said notch 36 and thereby the guide rail is positioned horizontally. The upper end 39 of the fixed bracket 37 is beveled as shown in Figure 16 to permit the rear end 35 of the guide rail 30 to enter the notch 36 as it is swung downwardly. This swinging guide rail has an important function to perform relatively to the opening of the ground glass door 18 which will be described hereinafter.

Figure 2:
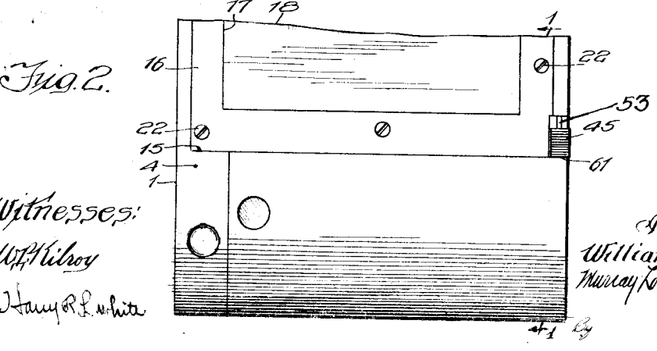
Figure 2 is a fragmentary rear view of the lower end of the camera.
Figure 3:
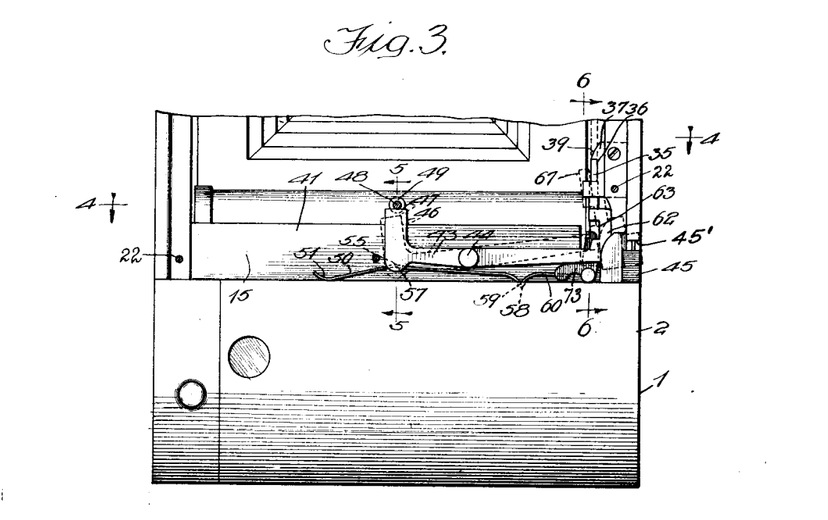
Figure 3 is a view similar to Figure 2 the rear wall or door frame being removed to expose some of the interlocking mechanisms.
Figure 4:
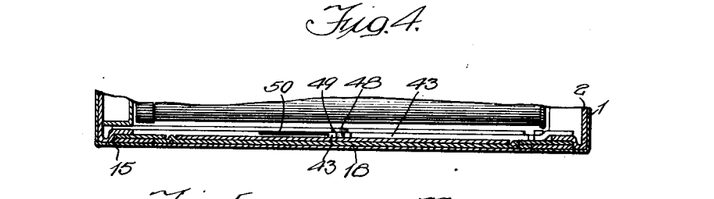
Figure 4 is a fragmentary horizontal sectional view on the line 4—4 of Figure 3.
Figure 5:
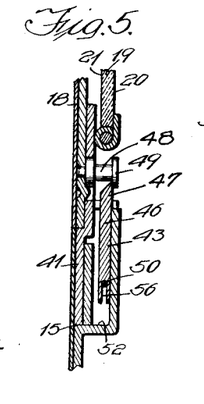
Figures 5 and 6 are vertical fragmentary sections on the line 5—5 and 6—6 respectively of Figure 3.
Figure 6:
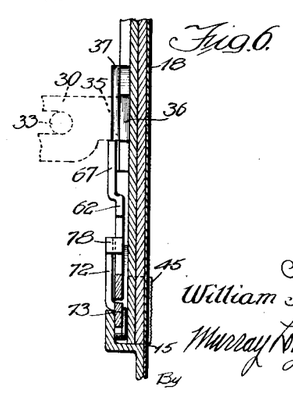

The lower end 40 of the frame 16 which carries the rear or ground glass door 18 is opposed to a vertical flange 41 forming part of the rear wall of the casing and between the two I provide a space 42 in which I arrange a pivoted lever 43 for locking the door 18 in its closed position. This lever, as best shown in Figure 3, is pivoted at a point 44 between its ends to the flange 41 and is provided on one end with a thumb piece 45 which is exposed as best shown in Figure 2 at the right hand edge of the back in position to be operatively engaged by the thumb of the right hand of the user of the camera when holding the camera in normal vertical position for taking a picture.

The adjacent side wall 7 of the camera is provided with a depression 45′ in its rear edge to receive the thumb piece 45 and permit its movement. The inner end 46 of the lever 43 projects upwardly and is arranged centrally of the camera and the extreme upper end 47 is adapted to engage a projection 48 rigid with the lower end of the door 18 and projecting inwardly from the inner surface thereof. The projection 48 has a rounded head 49 spaced from the inner surface of the door and the end 47 of the lever 43 is beveled for contact therewith and is adapted to engage beneath the head 49 and retain the door in closed position. The inner end of the lever 43 is normally held vertically and in locking position by a spring 50 made of spring wire, one end 51 of which is adapted to press downwardly on a ledge 52 formed in the casing and defining the opening in which the frame 16 is arranged. The spring 50 extends transversely of the casing and between its ends is bent upwardly to provide a portion 55 which enters a narrow slot 55 in a downwardly extending projection 57 at the inner end of the lever 43, said spring extending beyond said projection in a downwardly direction and provided with a sharp downwardly formed bend 58 adapted to enter a small depression 59 in said ledge 52 to retain the spring in its normal position. The end 60 of the spring which is opposite to the end 51, that is the end beyond the bend 58, has an operating function which will be described hereinafter. As so far described, the inner end of the lever 43 is normally held upwardly in position to retain the door 18 locked against opening and the outer end is normally held downwardly with the lower end of the thumb piece 45 in contact with the shoulder 61 at the lower end of the notch 46. The outer end of the lever is provided with an upwardly extending projection 62 provided on its inner edge with a notch 63, the function of which will be described hereinafter. Above the notch 63 the projection 62 is bent inwardly providing a shoulder 64 for contact with the lower edge 65 of the part 66 which forms the lower wall of the notch 36 in the fixed bracket 37. When the outer end of the lever 43 is swung upwardly to release the door the shoulder 64 contacts with the lower end 65 of the fixed bracket 37 to limit this upward swinging movement of the lever 43. When the lever 43 is allowed to swing as described its inner end is withdrawn from beneath the head 49 of the projection 48 and the door is released. Above the shoulder 64 the outer end of the lever is provided with a vertical projection 67 which extends upwardly into substantial contact with the lower edge of the free end 35 of the swinging guide rail 30 as best shown in Figure 1. Consequently when the guide rail is in the rearwardly extending position shown in full lines in Figure 1, that is, when its rear end is in the notch 36, the lever 43 is retained in its door locking position and cannot be swung to release the door. At the time that the parts are in the position described, the frame 14 is arranged close against the ground glass and if the door were permitted to swing open at this time, the ground glass and its frame would be forced against the bellows frame 14 and the camera might be injured. At such time the film and its casings are obviously arranged in the pocket 23 as shown in full lines in Figure 1.

I preferably make the camera case of aluminum for the purpose of making it as light in weight as possible and for finishing the outer surface I cover the case with leather. As the case is made of aluminum which is relatively soft the bottom of the notch or depression 45' in which the thumb piece 45 moves might wear rapidly as the lever 43 is preferably made of steel. To prevent excessive wear at this point, I provide a harder metal strip 54 held on the bottom of the notch 45'. This strip is preferably made of brass or some other suitable metal harder than aluminum and presents a bearing surface to the thumb piece 45.

As fully described in my said Patent No. 1,395,295, the film casings are adapted to be lifted from the pocket to positions within the casing to properly expose the desired areas of films but obviously this cannot occur until the lens board has been withdrawn from the casing and the bellows frame 14 has been moved to the forward side of the casing thus swinging the guide rail 30 to vertical position out of the way of the film casings.

Upon consideration it will be obvious that the rear door 18 should never be opened at times when the film would be exposed to light which would enter through this rear opening. I therefore provide associated locking parts which positively prevent the door unlocking movement of the lever 43 at times when the upper film casing 25 is raised to any extent from its retracted position shown in full lines in Figure 1.

Figure 15:
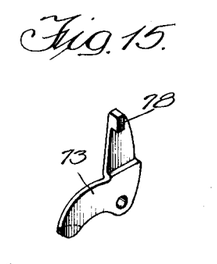
Figure 15 is a perspective view of one of the pivoted operating latch members.

On the end wall 68 of the casing 25 of the film roll 27 and which is adjacent to the projection 62 of the lever 43, I provide a rigid bracket 69 which carries a cam projection 70 having a rounded inner cam surface 71. This cam member is moved upwardly when the film casing 25 is moved upwardly and when the casing is in its lowermost position this cam surface contacts with an upwardly projecting arm 72 on a bell crank lever 73 pivoted to the casing at its heel on a suitable pivot 75 to swing in a vertical plane. The opposite end 76 of this bell crank lever is engaged by the end 60 of the wire spring 50, the arm 76 being provided with a perforation 77 to receive the end of the spring. The spring tends to hold the arm 76 upwardly and the opposite arm 72 of the bell crank lever in contact with the cam 70. The upper end 72 of this lever has a horizontal projection 78 which is yieldingly held outwardly to place said projection 78 in the notch 63 of the door locking lever 43. This engagement of the projection 78 occurs when the casing 25 is lifted sufficiently to disengage the cam 70 from the arm 72 of the lever 73, and when the projection 78 is in the notch 63 the outer end of the door control lever cannot be lifted and consequently the door cannot be unlocked. As best shown in Figure 15, the outer edge of the upper end of the arm 72 is rounded to permit an easy engagement of the cam with the lever arm 72 when the cam is pushed downwardly. When the cam is at its lower position, the arm 72 with the projection 78 is forced inwardly against pressure of the spring 60 and the projection 78 is swung out of the notch 63 thereby permitting the door locking lever 43 to be operated.

It is to be noted that all of the locking engagements in relation to the movements of levers are positive shoulder locks and do not depend upon frictional engagement of the parts. Also that in each instance, a very slight movement of the interrelated parts is provided for to assure clearance in the closing and locking movements without friction or binding.

Figures 7, 8, 9, 10, 11:
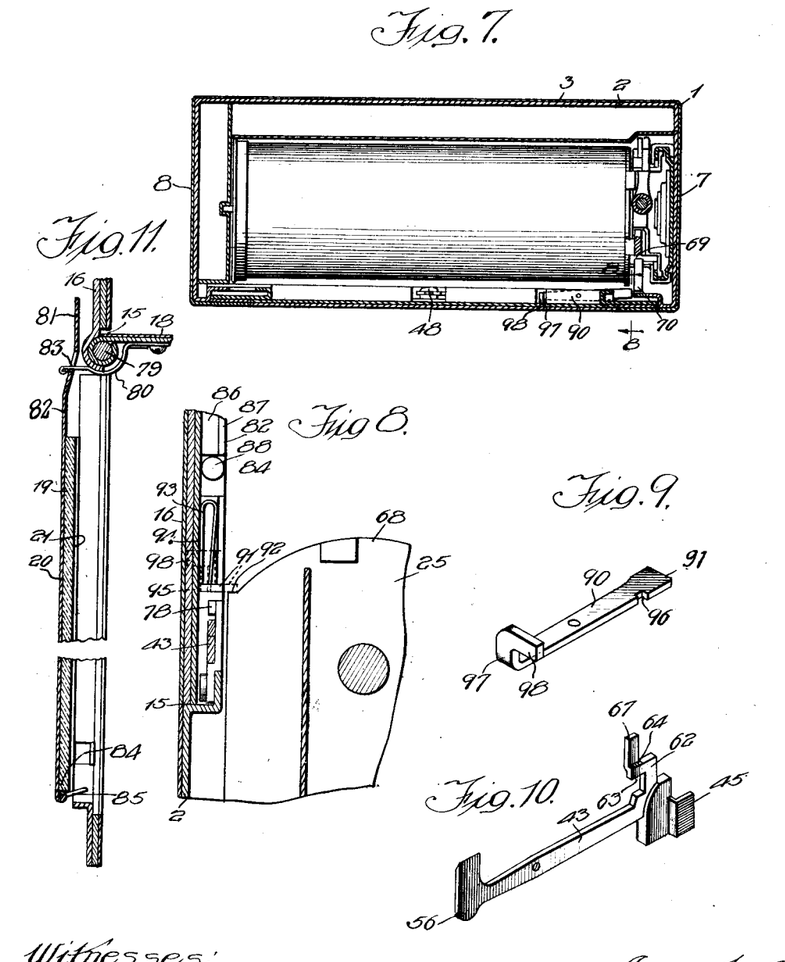
Figure 7 is a horizontal sectional view of the camera on the line 7—7 of Figure 1.
Figure 8 is a fragmentary vertical sectional view on the line 8—8 of Figure 7.
Figures 9 and 10 are perspective views of two of the operating levers.
Figure 11 is a fragmentary vertical section of the rear wall of the camera case particularly illustrating the operation of the ground glass and the rear door.

In Figure 11 I have shown a sectional view which illustrates the automatic movement of the ground glass plate when the rear door is opened. The door 18 is hinged at its upper end to the upper part of the frame 16 at 79 and is provided with rigid extending lever parts 80 which project through openings in an upper part 81 of the frame 82 in which the glass is mounted. The free ends of these projections 80 carry a rod 83 which is adapted to engage the rear face of the projecting part 81 on the frame 82 and as the door 18 is swung shut to draw the frame 82 outwardly toward the back wall of the camera casing the projections 80 being formed to engage the inner face of the said upwardly projecting part 81 to force the frame away from the back of the case when the door 18 is swung open. The lower end 84 of the frame 82 is hinged to the frame 16 by a swinging wire lever 85 pivotally mounted in the frame 16 so that when the door moves the upper end of the ground glass frame inwardly and also downwardly, the lower end is likewise thrown inwardly. In other words, the ground glass is maintained parallel with the back of the casing at all times.

Figure 12:
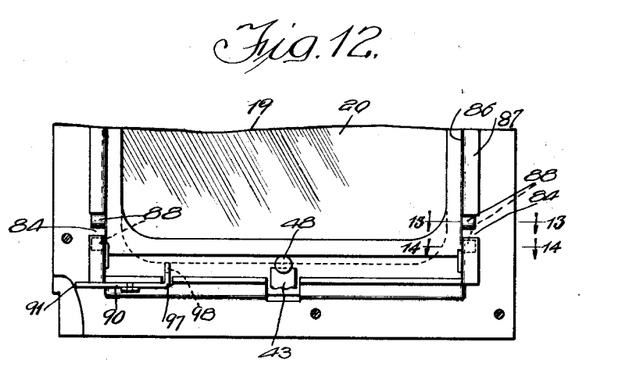
Figure 12 is a fragmentary plan view of the rear or ground glass door and the frame which carries it as seen from the inside.
Figure 13:
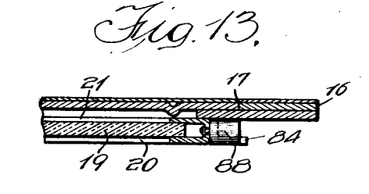
Figures 13 and 14 are fragmentary horizontal sectional views on the lines 13—13 and 14—14 respectively of Figure 12.
Figure 14:
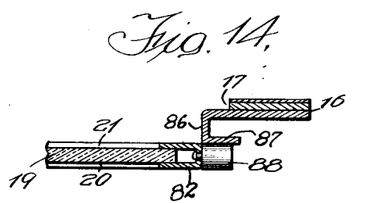

To provide a suitable depth on the frame 16 to receive the frame 82 of the ground glass, the frame 16 is provided with an inwardly extending flange 86 surrounding the opening which receives the cover 18 and this flange 86 is provided with an outwardly extending edge flange 87 at its inner edge. The flange 87 forms a flat surface surrounding the opening occupied by the ground glass frame and for positively supporting the lower end of the frame against any pressure which may be brought to bear against the frame by the bellows frame 14, by an inadvertent movement to the rear of the bellows frame 14 when the rear door is open and the ground glass is forward, I provide the ground glass frame 82 with rigid lateral projections 88 near its lower end adapted as shown in Figures 8 and 12 to rest upon the inner surface of the flange 87 when the ground glass is projected forwardly.

To positively prevent any outward movement of the casing 25 of the film roll 27 when the rear door 18 is open, I provide a horizontally swinging stop lever 90 pivotally mounted between its end on the lower end 40 of the frame 16 and having one end 91 adapted to be projected inwardly to engage a horizontal shoulder 92 on the wall 68 of the film roll casing 25 see Fig. 8. For yieldingly holding the end 91 projecting over the shoulder 92, I provide a U-shaped spring 93 mounted within the channel 94 formed by the flanges 86 and 87 and having an end 95 projecting back of the end 91 of the lever 90, the lever being provided with a notch 96 in its inner end for receiving the end 95 of the spring. The opposite end 97 of the lever 90 is provided with an inwardly extending projection 98 which projects into the path of the lower end of the door 18 as the same reaches its closed position. As the door 18 is swung to its closed position its lower end engages the projection 98 of the lever 90 swinging the end 97 of the lever inwardly and consequently the opposite end 91 outwardly and in thus swinging the end 91 outwardly, it disengages said end from the shoulder 92 on the film casing and permits said casing 25 to be moved in the camera casing.

It will now be understood that while the bellows frame 14 is in its rear position, that is adjacent to the rear wall of the camera the rear or ground glass door cannot be opened for the reason that at such time the swinging guide track is in its horizontal position and the door locking lever 43 is prevented from unlocking the door. Further at times when the film is extended, or in other words the film roll casing 25 is moved inward to any extent the door cannot be opened for the reason that the locking projection 78 on the bell crank lever 73 engages in the notch 63 in the door lock lever 43 and prevents its opening movement. Further, when the rear or ground glass door is opened the film cannot be extended. In other words, the roll film casing 25 cannot be moved to any extent at all for the reason that the end 91 of the locking lever 90 is projected over the shoulder 92 on the end wall 68 of the film roll casing 25. It is to be noted that the outer end 91 of the lever 90 bears against the lower end 99 of the inner flange 82 surrounding the opening 15 in the back wall of the casing so that if it is attempted to lift the film roll casing 25 when the rear door is open, this lever 90 cannot be bent by pressure from the film roll casing as the projection 98 is almost directly in line with the shoulder 92 and is in the best position to take the thrust without damage.

As many modifications of my invention will readily suggest themselves to one skilled in the art, I do ot limit or confine my invention to the specific details of construction or to the specific combinations of mechanisms herein shown and described.

I claim:

1. In a camera of the kind described, a ground glass plate arranged adjacent to the rear wall of the camera, a rear hinged door for covering the plate, a bellows frame arranged adjacent to the ground glass plate when the camera is closed and movable toward the front wall of the camera when the camera is open, means for mounting the plate and connecting it with the door so that as the door is opened the plate is moved forwardly in the casing, and means operable by the bellows frame for locking the door in closed position when the frame is adjacent to the ground glass plate.

2. In a camera of the kind described, a ground glass plate arranged adjacent to the rear wall of the camera, a rear hinged door for covering the plate, a bellows frame arranged adjacent to the ground glass plate when the camera is closed and movable toward the front wall of the camera when the camera is open, means for mounting the plate and connecting it with the door so that as the door is opened the plate is moved forwardly in the casing, a guide rail for the bellows frame pivoted at the front of the camera and adapted to be swung across the camera casing when the frame is moved to camera closed position, a locking lever pivotally mounted on the casing for normally retaining the rear door locked shut, the free end of said swinging guide rail being arranged to prevent the door unlocking movement of said pivoted lever when the bellows frame is in its rear position.

3. In a camera of the kind described, a ground glass plate arranged adjacent to the rear wall of the camera, a rear hinged door for covering the plate, a bellows frame arranged adjacent to the ground glass plate when the camera is closed and movable toward the front wall of the camera when the camera is open, means for mounting the plate and connecting it with the door so that as the door is opened the plate is moved forwardly in the casing, a spring pressed lever pivotally mounted on the casing for normally maintaining the rear door locked shut, said locking lever having a thumb piece operable from without the camera casing to unlock the door, a swinging guide rail for the bellows frame pivotally mounted on the front wall of the camera casing and adapted to be positioned across the casing when the bellows frame is moved rearwardly therein, and a projection on said locking lever adapted to engage the rear end of said swinging guide rail to prevent the unlocking movement of said lever.

4. In a camera of the kind described having film roll carriages movable within the camera casing for positioning a film in the focal plane and also adapted to be closed together in a pocket in one end of the camera casing, a rear door for the camera casing, a ground glass plate adapted to be positioned in and out of the focal plane by the opening and closing of the rear door, and means preventing the opening of said door at times when the film roll carriages are not fully retracted into said pocket.

5. In a camera of the kind described having film roll carriages movable within the camera casing for positioning a film in the focal plane and also adapted to be closed together in a pocket in one end of the camera casing, a rear door for the camera casing, a ground glass plate adapted to be positioned in and out of the focal plane by the opening and closing of the rear door, a locking lever for the door pivotally mounted on the casing one end of said lever having a notch, a pivotally mounted cooperating lever having a projection normally retained in said notch to prevent the door releasing movement of said locking lever and means operable by one of said film roll carriages as it reaches its retracted position to withdraw said projection from said notch as and for the purpose specified.

6. In a camera of the kind described having film roll carriages movable within the camera casing for positioning a film in the focal plane and also adapted to be closed together in a pocket in one end of the camera casing, a rear door for the camera casing, a ground glass plate adapted to be positioned in and out of the focal plane by the opening and closing of the rear door, a locking lever for the door pivotally mounted on the casing, one end of said lever having a notch, a pivotally mounted cooperating lever having a projection normally retained in said notch to prevent the door releasing movement of said locking lever, a cam projection rigid with one of said carriages adapted to contact with said cooperating lever and withdraw said projection from said notch as the carriage reaches its retracted position as and for the purpose specified.

7. In a camera of the kind described having film roll carriages movable within the camera casing to position a section of film in the focal plane, a rear door for the camera casing, a ground glass plate within the casing arranged to be moved into and out of the focal plane when the rear door is opened and closed, a lever pivoted between its ends on the casing, one end thereof arranged in the path of the door as it closes, the opposite end of the lever movable into and out of the path of a part of one of said film roll carriages, and adapted when the door is open to lock the carriages against movement in retracted position and to release the carriages for movement when the door is closed.

8. In a camera of the kind described having a casing made of a relatively soft light metal such as aluminum, the casing having a rear door, a lever normally holding the door locked in closed position, the lever provided on one end with a thumb piece arranged in contact with the outer surface of the casing, and a metal strip harder than the casing arranged beneath said thumb piece to prevent the wearing of the casing by the movement of said thumb piece.

9. In a camera of the kind described, a bellows frame within the camera movable from a retracted position adjacent to the rear wall to a camera open position adjacent to the front wall, film roll carriages movable from a retracted position in a pocket at one end of the camera casing to separated positions in the camera case to position a section of film in the focal plane, a ground glass plate adjacent to the rear wall of the camera, a rear door for exposing the ground glass plate, connection between the ground glass plate and the door for positioning the ground side of the plate in the focal plane as the door is opened and retracting the plate as the door is closed, means for preventing the rear door opening when the bellows frame is in its rear position, and means for preventing the opening of the door when the inner film carriage is moved inwardly from its fully retracted position.

10. In a camera of the kind described, a bellows frame within the camera movable from a retracted position adjacent to the rear wall to a camera open position adjacent to the front wall, film roll carriages movable from a retracted position in a pocket at one end of the camera casing to separated positions in the camera case to position a section of film in the focal plane, a ground glass plate adjacent to the rear wall of the camera, a rear door for exposing the ground glass plate, connection between the ground glass plate and the door for positioning the ground side of the plate in the focal plane as the door is opened and retracting the plate as the door is closed, means for preventing the rear door opening when the bellows frame is in its rear position, and means for preventing movement of the film carriages from their retracted positions when the door is open.

11. In a camera of the kind described, film roll carriages movable from a retracted position in a pocket at one end of the camera casing to separated positions in the camera case to position a section of film in the focal plane, the casing having a rear door, means for preventing the opening of the door when the inner film carriage is moved inwardly from its fully retracted position, and means for preventing movement of the film carriages from their retracted positions when the door is open.

12. In a camera of the kind described, a bellows frame within the camera movable from a retracted position adjacent to the rear wall to a camera open position adjacent to the front wall, film roll carriages movable from a retracted position in a pocket at one end of the camera casing to separated positions in the camera case to position a section of film in the focal plane, a ground glass plate adjacent to the rear wall of the camera, a rear door for exposing the ground glass plate, connection between the ground glass plate and the door for positioning the ground side of the plate in the focal plane as the door is opened and retracting the plate as the door is closed, means for preventing the rear door opening when the bellows frame is in its rearmost position, means for preventing the opening of the door when the inner film carriage is moved inwardly from its fully retracted position, and means for preventing movement of the film carriages from their retracted positions when the door is open.

13. In a camera of the kind described, a ground glass plate arranged adjacent to the rear wall of the camera, a rear hinged door for covering the plate, a bellows frame arranged adjacent to the ground glass plate when the camera is closed and movable toward the front wall of the camera when the camera is open, means for mounting the plate and connecting it with the door so that as the door is opened the plate is moved forwardly in the casing, and means for locking the door in closed position when the frame is adjacent to the ground glass plate.

14. In a camera of the kind described having film roll carriages movable within the camera casing for positioning a film in the focal plane and also adapted to be closed together in a pocket in one end of the camera casing, a rear door for the camera casing, a ground glass plate within the camera arranged to be seen when the rear door is open, and means preventing the opening of said door at times when the film roll carriages are not fully retracted into said pocket.

15. In a film camera, a pair of film carriages movable transversely of the camera case to position a section of film in the focal plane and to withdraw the film out of the focal plane and into a pocket, an image observation plate within the case, a door at the back of the case for opening to observe the image, the observation plate mounted for movement into the focal plane as the door is opened and out of the focal plane as the door is closed, means for locking the door shut when the film carriages are not fully withdrawn into the pocket, means for locking the film carriages against withdrawal when the door is not closed tight, and means for locking the door closed when the camera is open.

16. In a film camera of the kind described, having a bellows frame adapted to be positioned adjacent to the rear wall of the camera case when the case is closed and to be moved to a position adjacent to the front wall of the case when the case is open for use, a pair of film carriages movable transversely of the camera case to position a section of film in the focal plane and to withdraw the film out of the focal plane and into a pocket, an image observation plate within the case, a door at the back of the case for opening to observe the image, means for locking the door shut when the film carriages are not fully withdrawn into the pocket, means for locking the film carriages against withdrawal when the door is not closed tight, and means for locking the door shut when the bellows frame is in its rear position.

17. In a camera of the kind described, a rear door, an image observation plate, a bellows frame positioned adjacent to the plate when the camera is closed and away from the plate when the camera is open, interlocking mechanism and parts to prevent the door being opened when the film is extended, also when the camera is closed and, to prevent the extension of the film when the door is open and also when the camera is closed.

Signed at Chicago, Illinois, this 25th day of April, 1922.

WILLIAM A. PETERS.